United States Patent
Wu

(10) Patent No.: US 12,467,567 B2
(45) Date of Patent: Nov. 11, 2025

(54) COMPOSITE GARDEN HOSE AND PROCESS FOR PRODUCING COMPOSITE GARDEN HOSE

(71) Applicant: Yuanping Wu, Zhejiang (CN)

(72) Inventor: Yuanping Wu, Zhejiang (CN)

(*) Notice: Subject to any disclaimer, the term of this patent is extended or adjusted under 35 U.S.C. 154(b) by 15 days.

(21) Appl. No.: 18/407,444

(22) Filed: Jan. 9, 2024

(65) Prior Publication Data
US 2025/0224058 A1    Jul. 10, 2025

(51) Int. Cl.
*F16L 33/22* (2006.01)
*F16L 11/115* (2006.01)
*F16L 33/01* (2006.01)
*F16L 33/207* (2006.01)

(52) U.S. Cl.
CPC ............ *F16L 33/223* (2013.01); *F16L 11/115* (2013.01); *F16L 33/01* (2013.01); *F16L 33/2071* (2013.01); *F16L 33/2076* (2013.01)

(58) Field of Classification Search
CPC ........ F16L 33/223; F16L 11/115; F16L 33/01; F16L 33/20; F16L 33/207; F16L 33/2071; F16L 33/2073; F16L 33/2076; F16L 33/04; F16L 33/24; F16L 33/26; F16L 33/224; F16L 25/0036; F16L 39/02
See application file for complete search history.

(56) References Cited

U.S. PATENT DOCUMENTS

| | | | | |
|---|---|---|---|---|
| 3,017,203 | A * | 1/1962 | Macleod | F16L 33/2076 |
| 5,931,200 | A * | 8/1999 | Mulvey | |
| 6,000,434 | A * | 12/1999 | Winter | F16L 11/115 |
| 11,118,707 | B2 * | 9/2021 | Zhang | F16L 33/01 |
| 2008/0272590 | A1 * | 11/2008 | Howard | F16L 33/224 |
| 2013/0113205 | A1 * | 5/2013 | Berardi | F16L 33/01 |
| 2015/0167875 | A1 * | 6/2015 | Huang | F16L 33/224 |
| 2015/0354740 | A1 * | 12/2015 | Schlitter | F16L 33/2071 |
| 2017/0205004 | A1 * | 7/2017 | Zhou | |
| 2019/0242502 | A1 * | 8/2019 | Pan | F16L 33/223 |

FOREIGN PATENT DOCUMENTS

CN       204785210 U  * 11/2015  .......... F16L 33/2071

OTHER PUBLICATIONS

CN-204785210-U—Machine Translation—English (Year: 2015).*

* cited by examiner

*Primary Examiner* — William S. Choi
(74) *Attorney, Agent, or Firm* — Hawaii Patent Services; Nathaniel K. Fedde; Kenton N. Fedde

(57) ABSTRACT

A composite garden hose comprises a pipe body, a first connector and a second connector, wherein, the pipe body comprises a first tubular part, a second tubular part and a third tubular part; the hardness of the first tubular part is lower than that of the second tubular part; the hose further comprises a first connector and a second connector, and the pipe body is connected with the first connector and the second connector.

14 Claims, 19 Drawing Sheets

COMPOSITE GARDEN HOSE AND PROCESS FOR PRODUCING COMPOSITE GARDEN HOSE

TECHNICAL FIELD

The present invention relates to the technical field of water pipes, in particular to a composite garden hose and a process for producing the composite garden hose.

BACKGROUND

Garden hose is a kind of pipe used to transport water or other liquids, which plays an important role in people's lives. Garden hose can not only provide people with domestic water, such as drinking water, washing water, irrigation water, etc., but also be used in fire fighting, heating, refrigeration, industrial production and so on. The material, shape, size and connection mode of garden hose will affect the speed, pressure, temperature and quality of water flow, therefore it is necessary to choose a suitable garden hose according to different uses and environments.

However, the existing garden hoses in the market are generally not tough enough, which is easy to cause wear, damage and short service life during use. For example, a garden hose disclosed in U.S. Pat. No. 17,521,376 has the problems of easy wear and short service life; similarly, a garden hose disclosed in U.S. Pat. No. 15,638,057 also has the problems of low durability and insufficient toughness.

Therefore, based on the above problems, a brand-new composite garden hose is proposed, which has higher toughness, lower wear rate and more durability, and can provide users with better garden hose experience and better garden hose selection.

SUMMARY

The present invention provides a composite garden hose, including a pipe body, a first connector and a second connector, wherein the pipe body comprises:
  a first tubular part made of an elastic material to transport liquid; and
  a second tubular part made of plastic or a rubber material, wherein the second tubular part has a corrugated structure and is continuously formed around the first tubular part to limit the expansion of the first tubular part; and
  a third tubular part made of a fabric material and continuously formed around the second tubular part to protect the first tubular part and the second tubular part; and
  a hardness of the first tubular part is lower than that of the second tubular part; and
  wherein, the first connector is arranged at one end of the pipe body, and the second connector is arranged at the other end of the pipe body; and one end of the pipe body is closely connected with the said first connector using metal fasteners, and the other end of the pipe body is closely connected with the said second connector also using metal fasteners.

The present invention further provides a composite garden hose, including a pipe body, a first connector and a second connector, wherein the pipe body comprises:
  a first tubular part made of an elastic material to transport liquid; and
  a second tubular part made of a metal material, wherein second tubular part has a spiral structure and is continuously formed around the first tubular part to limit the expansion of the first tubular part; and
  a third tubular part made of a fabric material and continuously formed around the second tubular part to protect the first tubular part and the second tubular part; and
  a hardness of the first tubular part is lower than that of the second tubular part; and
  wherein, the first connector is arranged at one end of the pipe body, and the second connector is arranged at the other end of the pipe body; and one end of the pipe body is closely connected with the said first connector using clamping components, and the other end of the pipe body is closely connected with the said second connector also using clamping components.

The present invention also provides a process for producing a composite garden hose, which includes the following steps:
  step 1, preparing an elastic material and a first extruder for manufacturing a first tubular part; preparing a material and a second extruder for manufacturing a second tubular part; preparing a fabric material and a knitting machine for manufacturing the third tubular part; preparing a die and a punching machine for stamping; wherein the first extruder, the second extruder and the knitting machine are arranged in sequence;
  Step 2, preparing grips, metal fasteners, a first connector and a second connector;
  Step 3, starting the machine, introducing a first tubular part extruded by the first extruder into the second extruder, and the second extruder extruding a second tubular part covering the first tubular part outside the first tubular part; introducing the first tubular part and the second tubular part into the knitting machine, and knitting a third tubular part covering the second tubular part outside the second tubular part to form a continuous pipe body;
  Step 4, cutting the continuous pipe into required lengths;
  Step 5, sleeving the pipe body after cutting with two grips;
  Step 6, sleeving both ends of the pipe body with a metal fastener;
  Step 7, respectively inserting the first connector and the second connector into both ends of the pipe body;
  Step 8, punching and pressing the metal fastener by the die and the punching machine, so that one end of the metal fastener and the pipe body are closely connected with the first connector; tightly connecting the metal fastener, the other end of the pipe body and the second connector; and
  Step 9, connecting one of the grips with the first connector; connecting the other grip to the second connector.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

Figure 1:
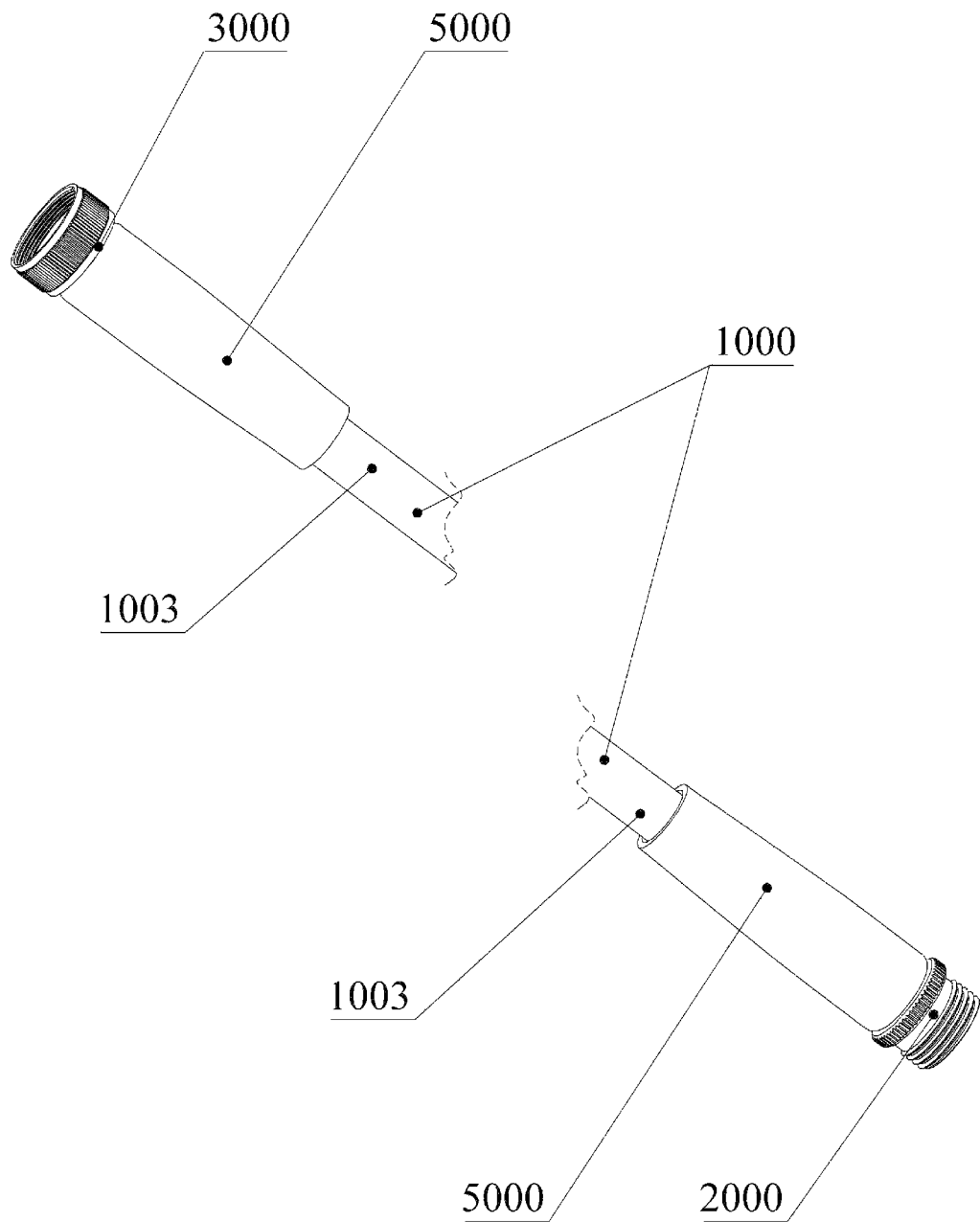
FIG. 1 is a schematic view of a garden hose.

In the drawings:
Pipe body (1000); First tubular part (1001); Second tubular part (1002); Third tubular part (1003); Spiral pipe (1004); First connector (2000); Pipe connecting part (2001); Anti-slip part (2002); External thread connecting part (2003); First groove (2004); Insertion part (2005); Second groove (2006); Second connector (3000); Connecting core (3001); Internal thread bushing (3002); Sealing ring (3003); First flange (3004); Second flange (3005); Anti-slip groove (3006); Metal fastener (4000); Clamping component (4001); Inner snap ring (4002); Outer sleeve (4003); Compression part (4004); Compression block (4005); First threaded part (4006); Second threaded part (4007); First fixing block (4008); Second fixing block (4009); First fixing hole (4010); Second fixing hole (4011); Fastener (4012); Grip (5000); Buckle part (5001); Groove (5002); Internal thread (5003); External thread (5004).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As shown in FIGS. 1 to 4, the present invention provides a composite garden hose, which includes a pipe body 1000, a first connector 2000 and a second connector 3000;

wherein, the pipe body 1000 includes a first tubular part 1001 made of an elastic material to transport liquid;

the second tubular part 1002, which is made of an inelastic material and has a corrugated structure, is continuously formed around the first tubular part 1001 to limit the expansion of the first tubular part 1001;

a third tubular part 1003 made of a fabric material and continuously formed around the second tubular part 1002 to protect the first tubular part 1001 and the second tubular part 1002;

the hardness of the first tubular part 1001 is lower than that of the second tubular part 1002;

wherein, the first connector 2000 is arranged at one end of the pipe body 1000, and the second connector 3000 is arranged at the other end of the pipe body 1000; and the two ends of the pipe body 1000 are respectively closely connected with the first connector 2000 and the second connector 3000 through metal fasteners 4000;

a grip 5000 is sleeved on the third tubular part 1003, and the grip 5000 is detachably connected with the first connector 2000; the grip 5000 is detachably connected with the second connector 3000.

The first tubular part 1001 is made of an elastic material. In this embodiment, the elastic material can be polypropylene random copolymer PPR, polyethylene PE, ethylene propylene diene monomer EPDM, polyurethane PU and any other desired elastic materials.

The second tubular part 1002 is made of plastic or a rubber material. In this embodiment, the second tubular part 1002 is made of PVC, but it is not limited to PVC, and can also be PPR or PE and any desired materials.

In this embodiment, the third tubular part 1003 is made of a fabric material, which can be set as polyester fabric, cotton fabric, glass fiber fabric, carbon fiber fabric and any other fabric material as desired. In other embodiments (not shown in the figure), the third tubular part is not limited to being made of a fabric material, but can also be made of plastic, a metal material, silica gel and any desired materials.

In this embodiment, the hardness of the first tubular part 1001 is lower than that of the second tubular part 1002. In other embodiments, the hardness of the first tubular part 1001 is not limited to being lower than that of the second tubular part 1002, but may be equal to or higher than that of the second tubular part 1002.

As shown in FIGS. 5 to 8, in this embodiment, the metal fastener 4000 is formed into a gourd shape or a cylindrical shape by machine stamping. In other embodiments (not shown in the figure), it can also be set as trapezoid, ellipse, triangle and any desired geometric shape. In other embodiments, it is not limited to being formed by machine stamping, but also can be set to turning, milling, drilling, casting and any desired processing methods.

In this embodiment, both ends of the pipe body 1000 are closely connected with the first connector 2000 and the second connector 3000 through metal fasteners 4000, respectively. In other embodiments (not shown in the figure), the two ends of the pipe body are not limited to being closely connected with the first connector and the second connector by metal fasteners, but also can be made of plastic, silica gel and any desired materials, and can also be made of screw connection, pin connection, rivet connection, snap connection, welding and any desired connection mode.

Figure 5:
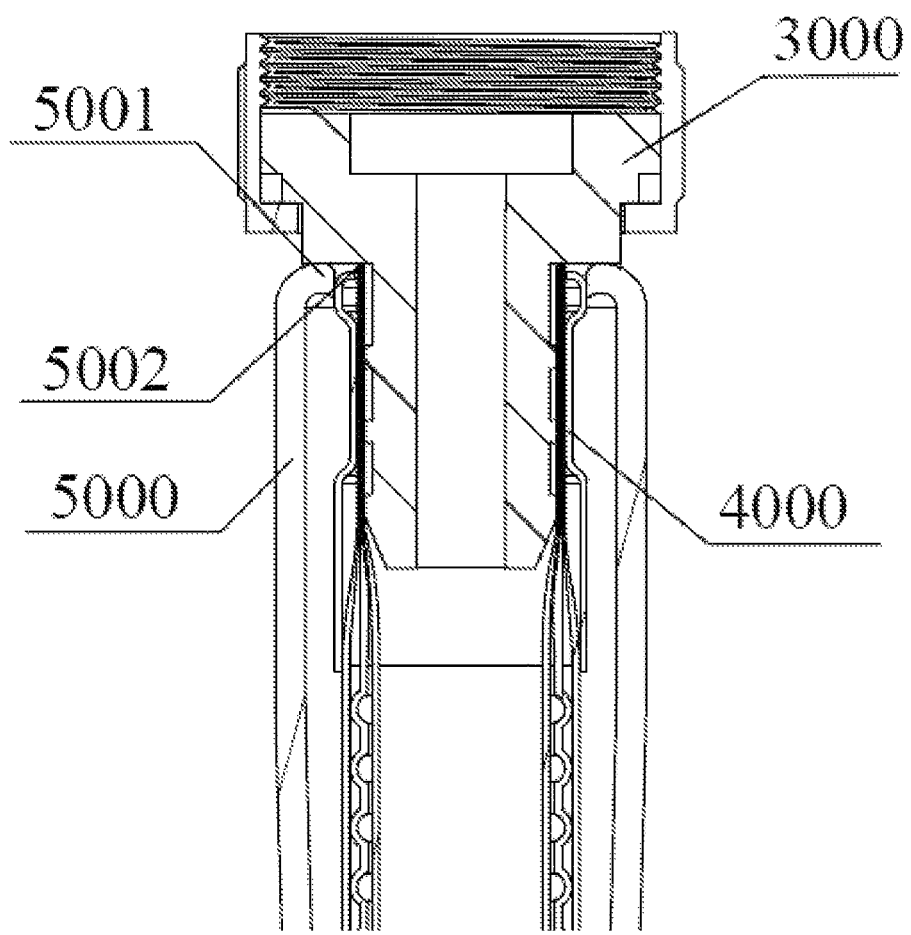
FIG. 5 is a sectional view of the second connector.

As shown in FIG. 5, in this embodiment, the grip 5000 is made of an elastic material, and one end of the grip 5000 is curled inward to form a buckle part 5001; grooves 5002 are formed between the metal fastener 4000 and the first connector 2000 and the second connector 3000, respectively, and the buckle part 5001 is clamped into the grooves 5002.

Figure 6:
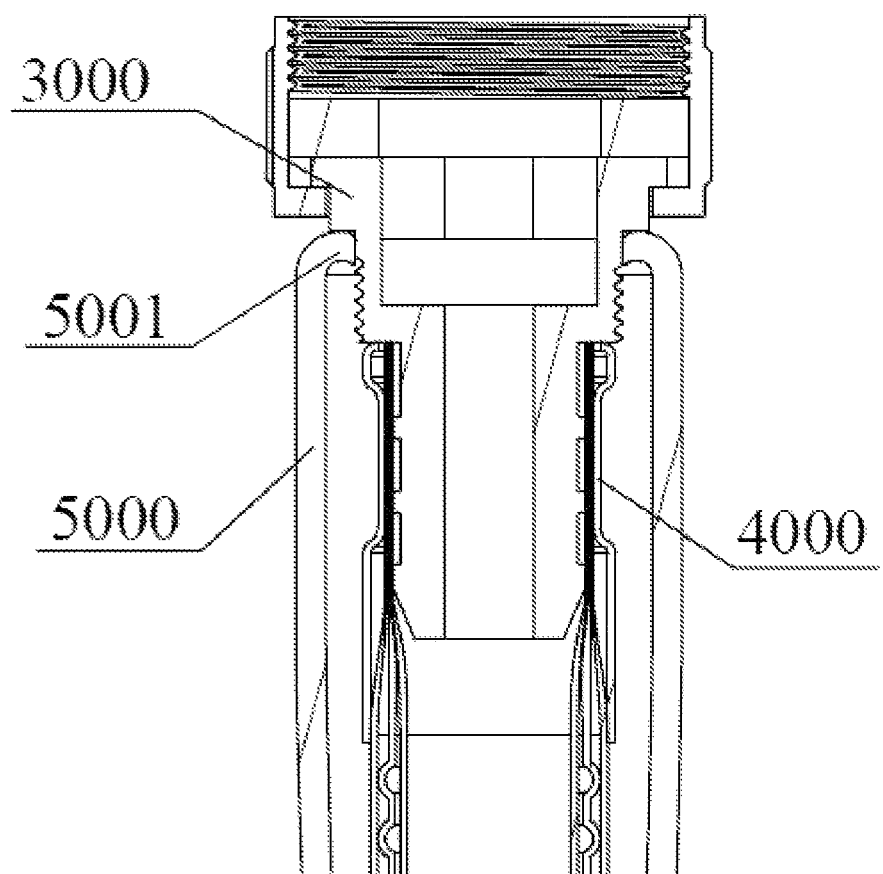
FIG. 6 is a schematic diagram of another embodiment of FIG. 5.

As shown in FIG. 6, in some embodiments, the buckle part 5001 is clamped on the second connector 3000; similarly (not shown in the figure), the buckle part 5001 is clamped on the first connector 2000.

Figure 7:
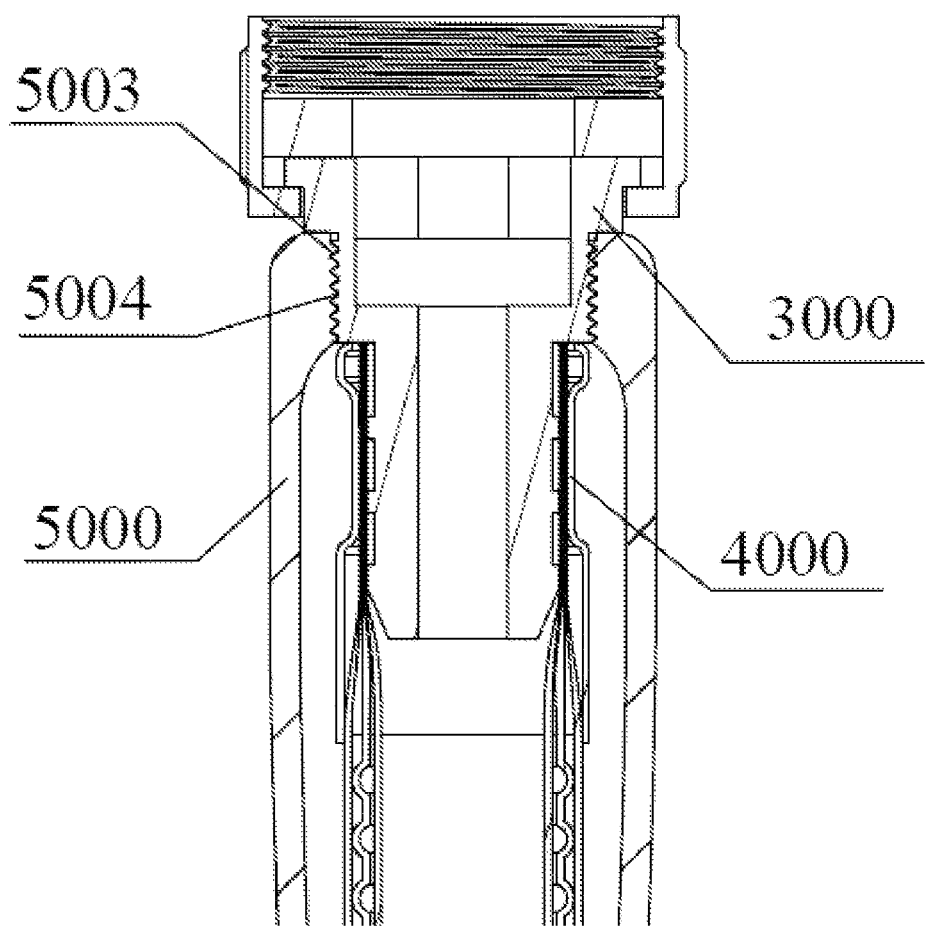
FIG. 7 is a second schematic view of another embodiment of FIG. 5.
Figure 8:
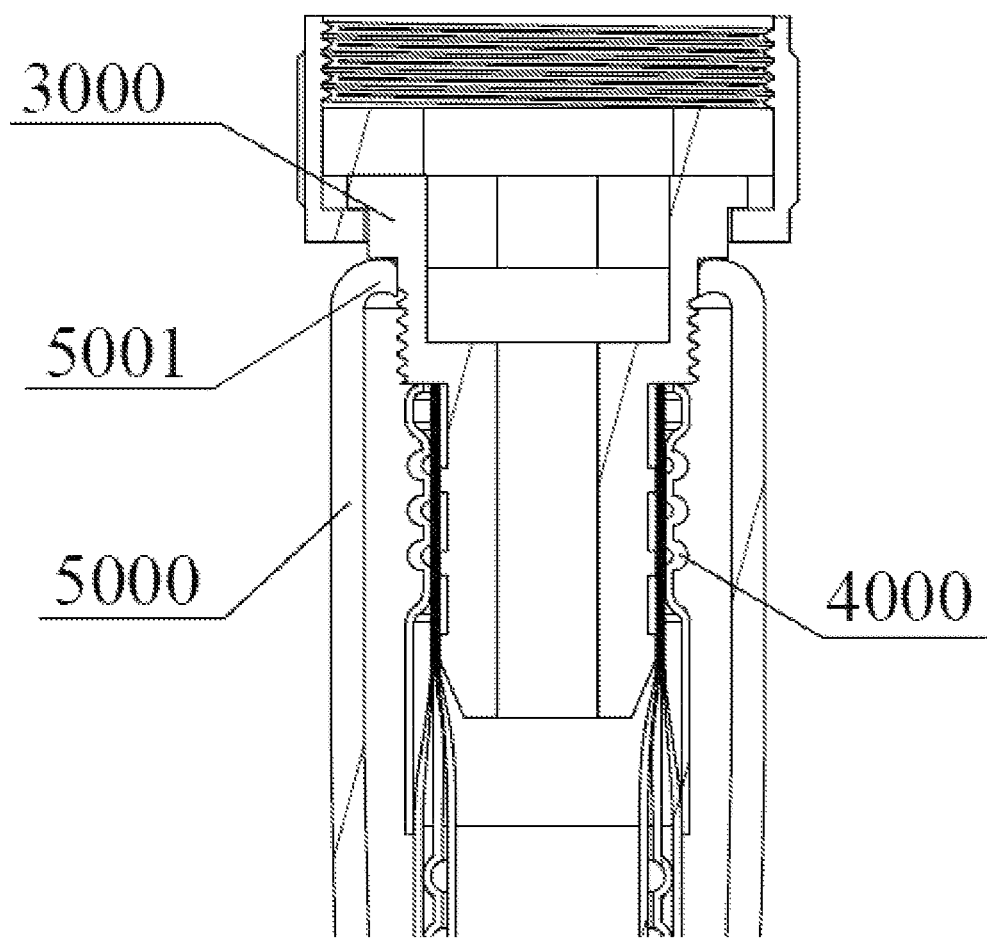
FIG. 8 is a third schematic view of another embodiment of FIG. 5.
Figure 9:
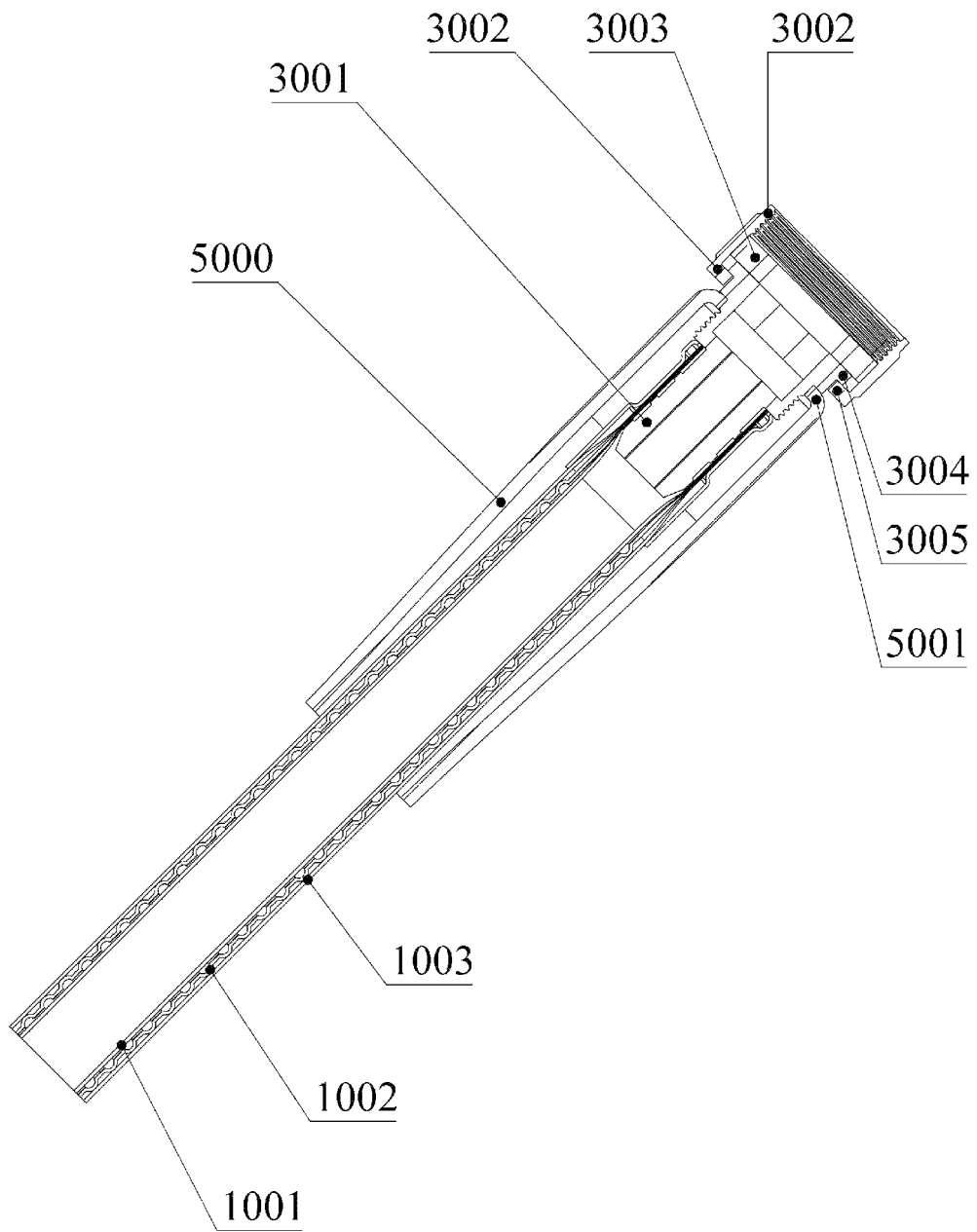
FIG. 9 is another sectional view of the second connector.

As shown in FIG. 7, in other embodiments, one end of the grip 5000 is provided with an internal thread 5003; the first connector 2000 and the second connector 3000 are both provided with external threads 5004, which are used for connecting the grip 5000, and the grip 5000 is closely connected with the first connector 2000 and the second connector 3000 through screw fitting.

Wherein, the grip 5000 is closely connected with the first connector 2000 and the second connector 3000 through screw fitting. In other embodiments (not shown in the figure), the grip is not limited to being closely connected with the first connector and the second connector through thread fitting, but can also be set as thread connection, pin connection, rivet connection, snap connection and any desired connection mode.

In this embodiment, the grip 5000 is made of an elastic material, which can be made of polypropylene random copolymer PPR, polyethylene PE, ethylene propylene diene monomer EPDM, polyurethane PU and any other desired elastic materials. In other embodiments (not shown in the figure), the grip is not limited to being made of elastic materials, but can also be made of inelastic materials and any desired materials.

Figure 2:
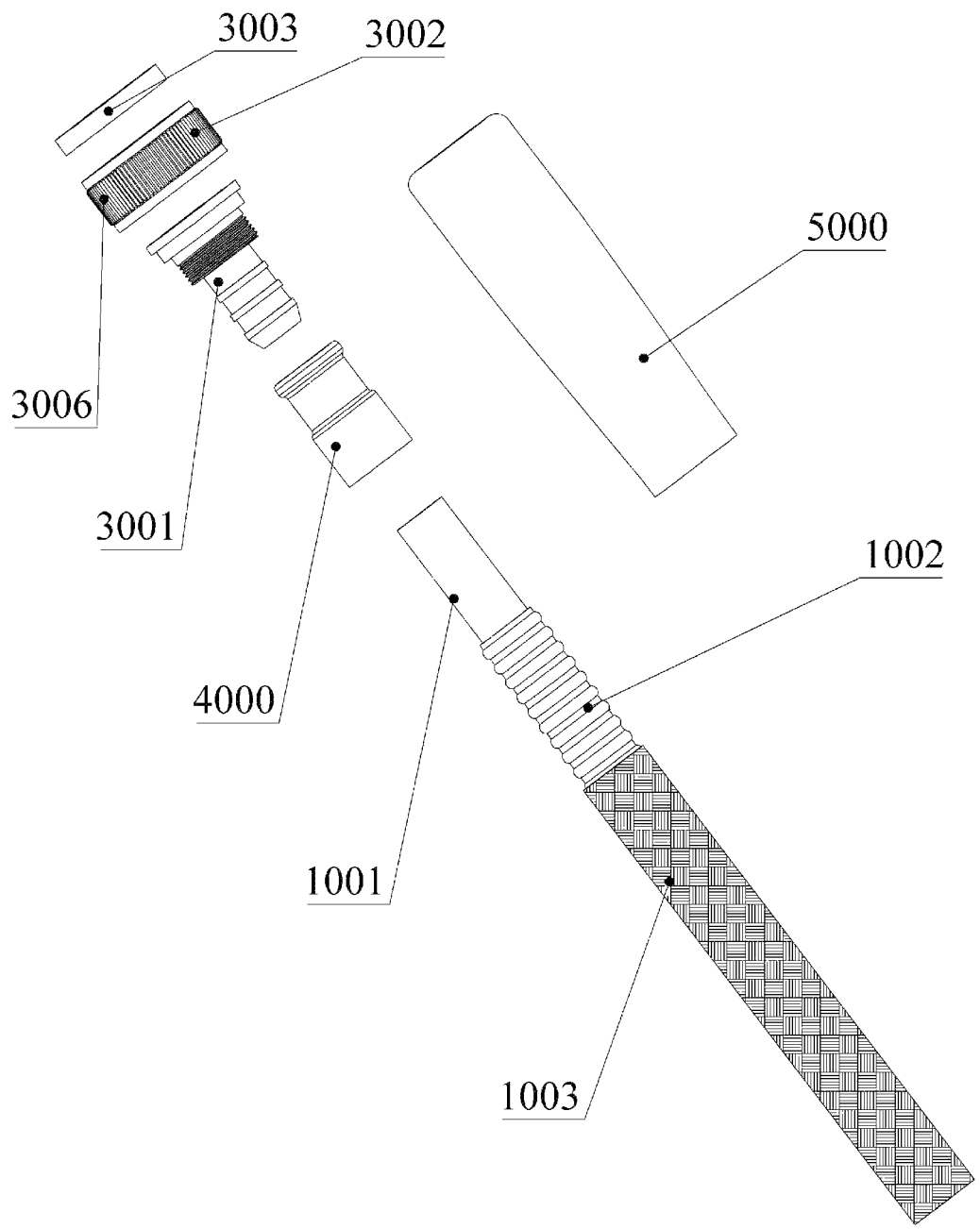
FIG. 2 is a partial exploded view of the garden hose.
Figure 3:
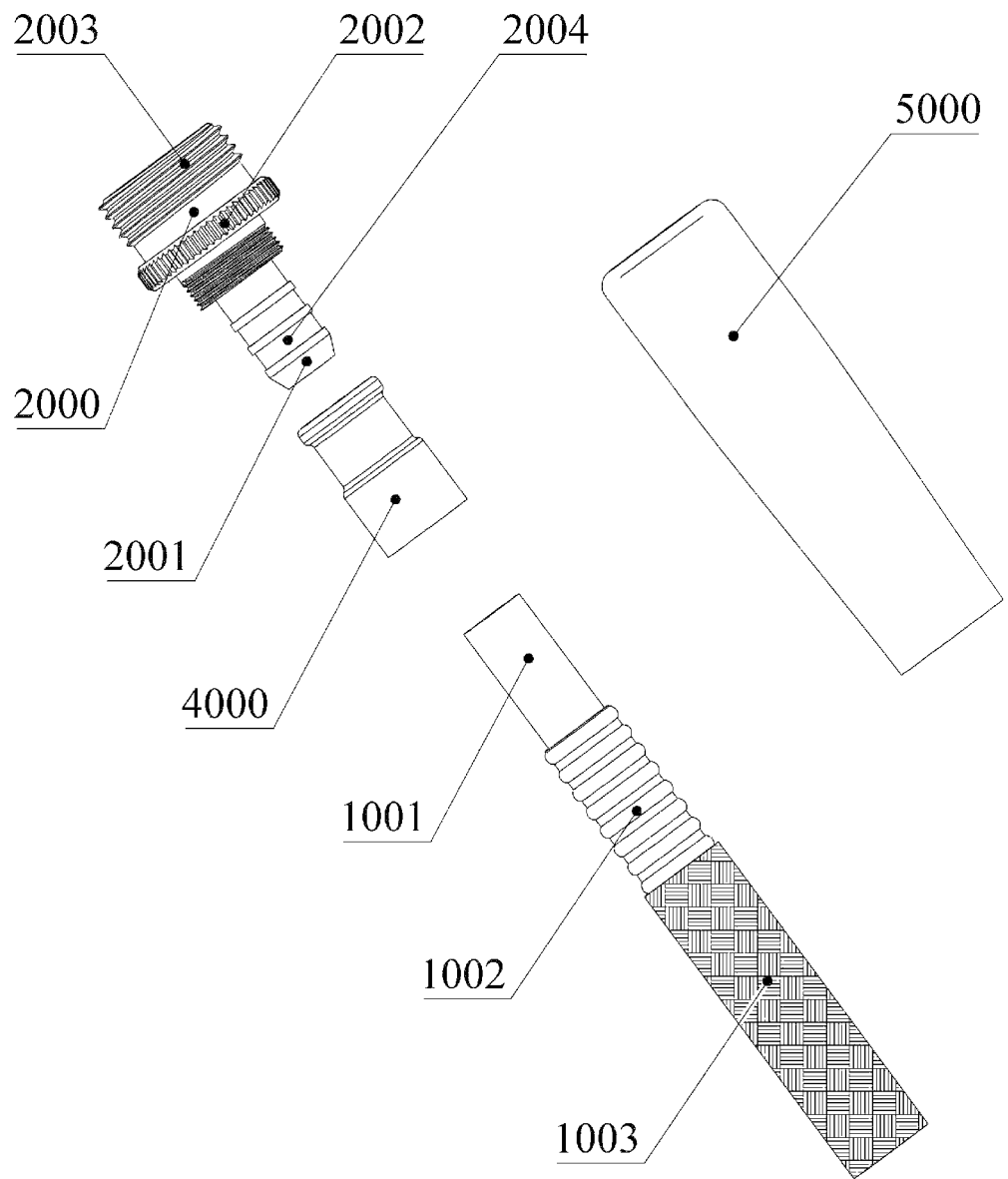
FIG. 3 is an exploded view of another part of the garden hose.
Figure 4:
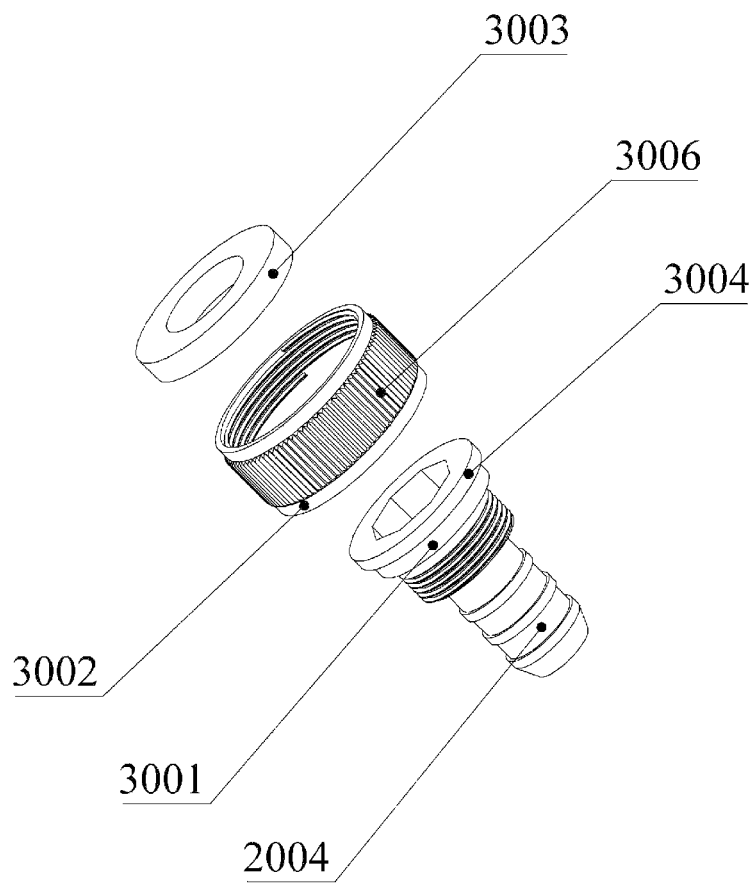
FIG. 4 is a schematic view of the second connector.

As shown in FIGS. 1 to 3, in this embodiment, the first connector 2000 includes a tubular connecting part 2001, an anti-slip part 2002 and an external thread connecting part 2003 which are arranged in sequence; the pipe connecting part 2001 is used to connect with the pipe body 1000, the anti-slip part 2002 is used to prevent slipping during installation, and the external thread connecting part 2003 is used for connecting.

As shown in FIGS. 1 to 9, in this embodiment, the second connector 3000 includes a connecting core 3001, an internal thread bushing 3002 and a sealing ring 3003, and the sealing ring 3003 is elastic. The connecting core 3001 is used for connecting with the pipe body 1000; the connecting core 3001 is provided with a first flange 3004 extending outward; the first flange 3004 is arranged at one end of the connecting core 3001 far away from the pipe body 1000; a second flange 3005 is provided at one end of the internal thread bushing 3002, and the second flange 3005 extends inward; the outer diameter of the first flange 3004 is larger than the inner diameter of the second flange 3005.

In this embodiment, the connecting core 3001 and the internal thread bushing 3002 are connected by the first flange 3004 and the second flange 3005. In other embodiments, the connection between the connecting core 3001 and the internal thread bushing 3002 is not limited to being connected through the first flange 3004 and the second flange 3005, but can also be integrated, snap-connected, welded, screwed, pin-connected, rivet-connected and connected in any desired connection mode.

As shown in FIG. 2, in this embodiment, an anti-slip groove 3006 is provided outside the internal thread bushing 3002, and the anti-slip groove 3006 extends in the axial direction; anti-slip grooves 3006 are arranged in an array along the outer circumference of the internal thread bushing 3002. In other embodiments (not shown in the figure), the anti-slip groove is not limited to the above shape, but can also be set into a ring shape, a polygon shape, an ellipse shape and any desired geometric shape that can play an anti-slip role, and its material can be metal or plastic.

As shown in FIG. 2, in this embodiment, the sealing ring 3003 is made of rubber or silica gel, and the outer diameter of the sealing ring 3003 is larger than the inner diameter of the internal thread bushing 3002. When the sealing ring 3003 is installed in the internal thread bushing 3002, the sealing ring 3003 can limit the internal thread bushing 3002. Wherein the sealing ring 3003 can be made of nitrile rubber, hydrogenated nitrile rubber, silicone rubber, fluorosilicone rubber, ethylene propylene diene monomer, neoprene, butyl rubber, acrylate rubber, natural rubber, polyurethane rubber, metal rubber and any materials as desired.

As shown in FIG. 3, in this embodiment, more than one first groove 2004 is formed in the pipe connecting part 2001, and the first groove 2004 is used to increase friction; the first groove 2004 surrounds the pipe connecting part 2001; the pipe connecting part 2001 is also provided with a chamfer, which is arranged at one end far away from the anti-slip part 2002, and the connecting core 3001 is also provided with more than one first groove 2004.

In other embodiments, the pipe connecting part 2001 is not limited to increasing the friction by proving the first groove 2004, and other structures can be set to increase the friction, or other ways can be used to connect the first connector 2000 and the pipe body 1000.

In this embodiment, the first tubular part 1001 is made of rubber or plastic; the second tubular part 1002 is made of plastic; when the water pressure increases, the first tubular part 1001 will expand radially, and the radial expansion of the first tubular part 1001 will be limited by the maximum diameter of the second tubular part 1002. Wherein, the first tubular part 1001 is not limited to generating a certain radial expansion, but may also generate axial expansion.

In this embodiment, the material of the first tubular part 1001 is PVC, but it is not limited to PVC, and it can also be any desired material such as PPR, TPU, PE or rubber.

In this embodiment, the material of the second tubular part 1002 is PVC, but it is not limited to PVC, and it can also be PPR or PE and any desired material.

In this embodiment, the third tubular part 1003 is woven from a fabric material and cannot be radially expanded; the thickness of the third tubular part 1003 is 0.3 mm to 0.8 mm. In some embodiments, the thickness of the third tubular part 1003 is not limited to 0.3 mm to 0.8 mm, but can also be set to 0.1 mm to 0.6 mm, 0.5 mm to 1.2 mm, 0.8 mm to 1.5 mm and any desired thickness.

In this embodiment, the grip 5000 is made of plastic, and the thickness of the grip 5000 is 1 mm to 10 mm, and the length is 20 mm to 200 mm.

In other embodiments, the thickness of the grip 5000 is not limited to 1 mm to 10 mm, and the length is not limited to 20 mm to 200 mm. It can also be set to any desired thickness and length.

Figure 10:
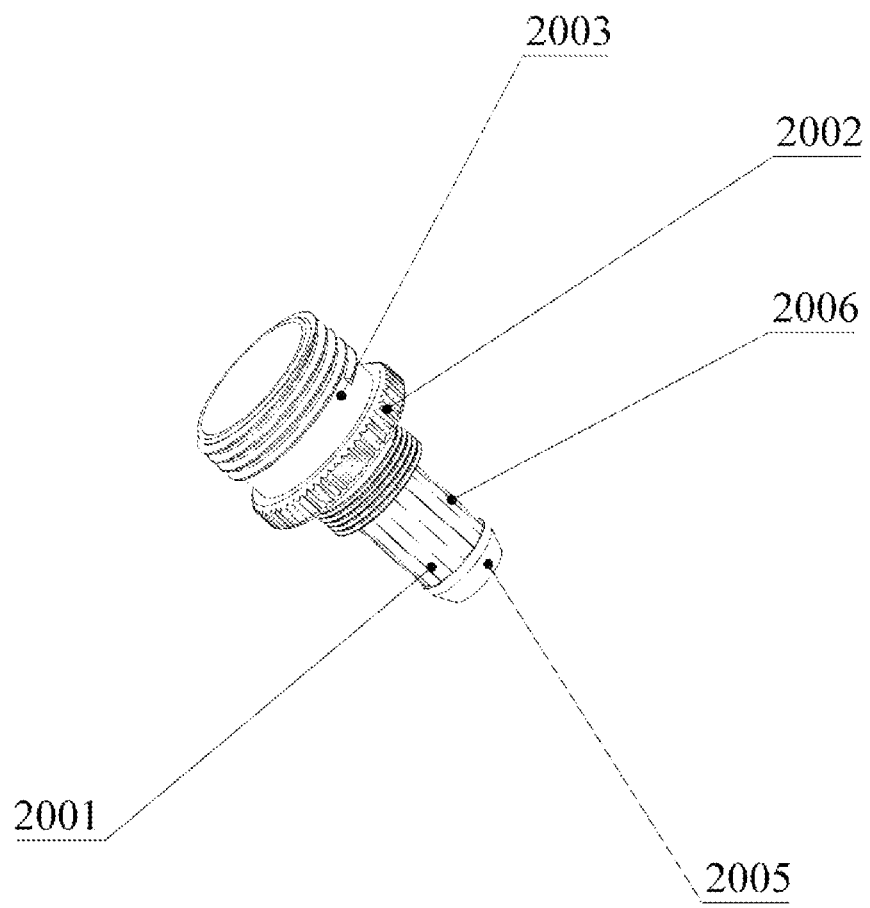
FIG. 10 is a schematic view of a first connector in another embodiment.

As shown in FIG. 10, in another example, an insertion part 2005 is provided at the pipe connecting part 2001, and the insertion part 2005 is arranged at one end far away from the anti-slip part 2002; the outer diameter of the insertion part 2005 is larger than that of the pipe connecting part 2001, and a chamfer is provided on the insertion part 2005; more than two second grooves 2006 are formed on the surface of the pipe connecting part 2001 in the axial direction, and the second grooves 2006 are used to increase friction; the second grooves 2006 are evenly distributed on the surface of the pipe connecting part 2001.

In other embodiments, the pipe connecting part 2001 is not limited to increasing the friction by providing the second groove 2006, and other structures can be set to increase the friction, or other ways can be used to connect the first connector 2000 and the pipe body 1000.

Figure 11:
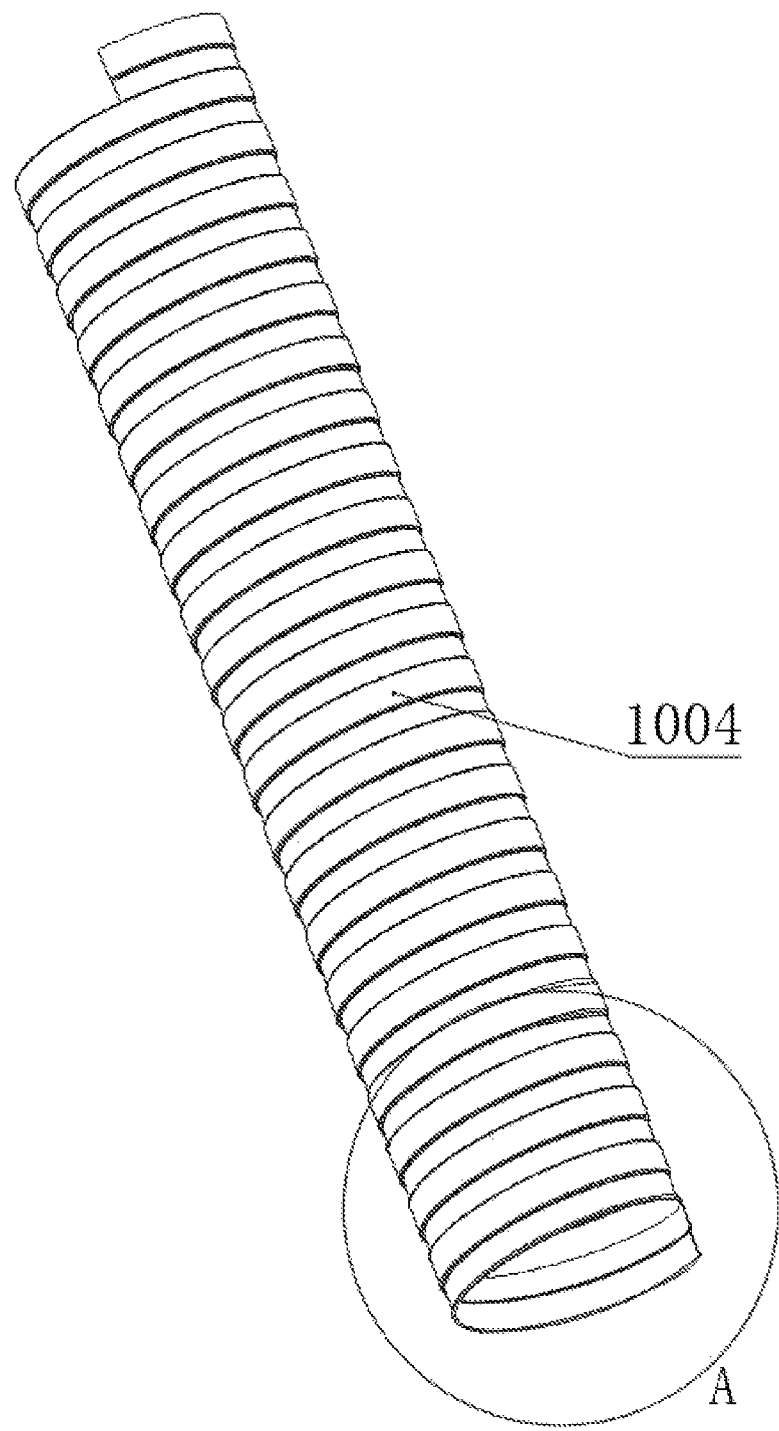
FIG. 11 is a schematic view of a spiral pipe.
Figure 12:
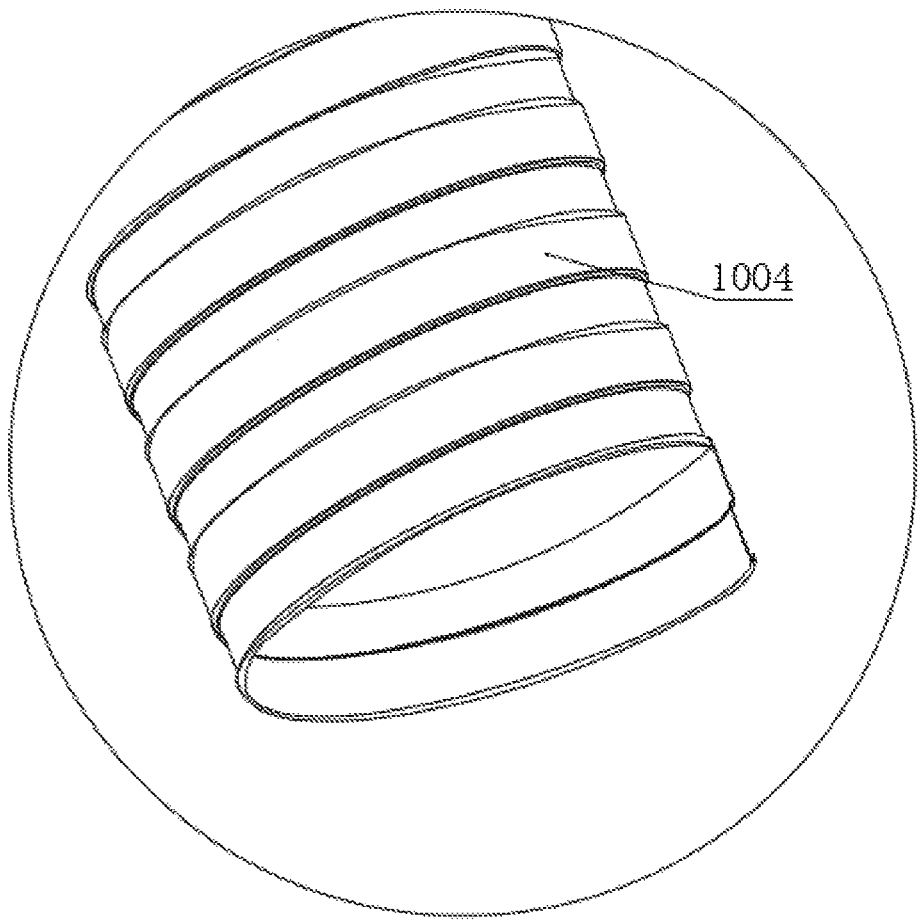
FIG. 12 is an enlarged view at A in FIG. 10.

As shown in FIG. 11 and FIG. 12, it is another embodiment provided by the present invention. The difference between this embodiment and the above embodiment is that the second tubular part is a spiral pipe 1004, which is made of metal. In this embodiment, the spiral pipe 1004 is preferably made of stainless steel.

In other embodiments, the spiral pipe 1004 is not limited to stainless steel, but can also be made of any desired material such as copper and aluminum-plastic composite pipe. In other embodiments, the second tubular part is not limited to a spiral pipe, but can also be arranged as a circular pipe, a square pipe, a rectangular pipe, an elliptical pipe and any desired geometric shapes.

As shown in FIGS. 13 to 16, it is another embodiment provided by the present invention. The difference between this embodiment and the above-mentioned embodiment is that the first connector 2000 is arranged at one end of the pipe body 1000, and the second connector 3000 is arranged at the other end of the pipe body 1000. The two ends of the pipe body 1000 are closely connected with the first connector 2000 and the second connector 3000 through the clamping component 4001 respectively.

Figure 13:
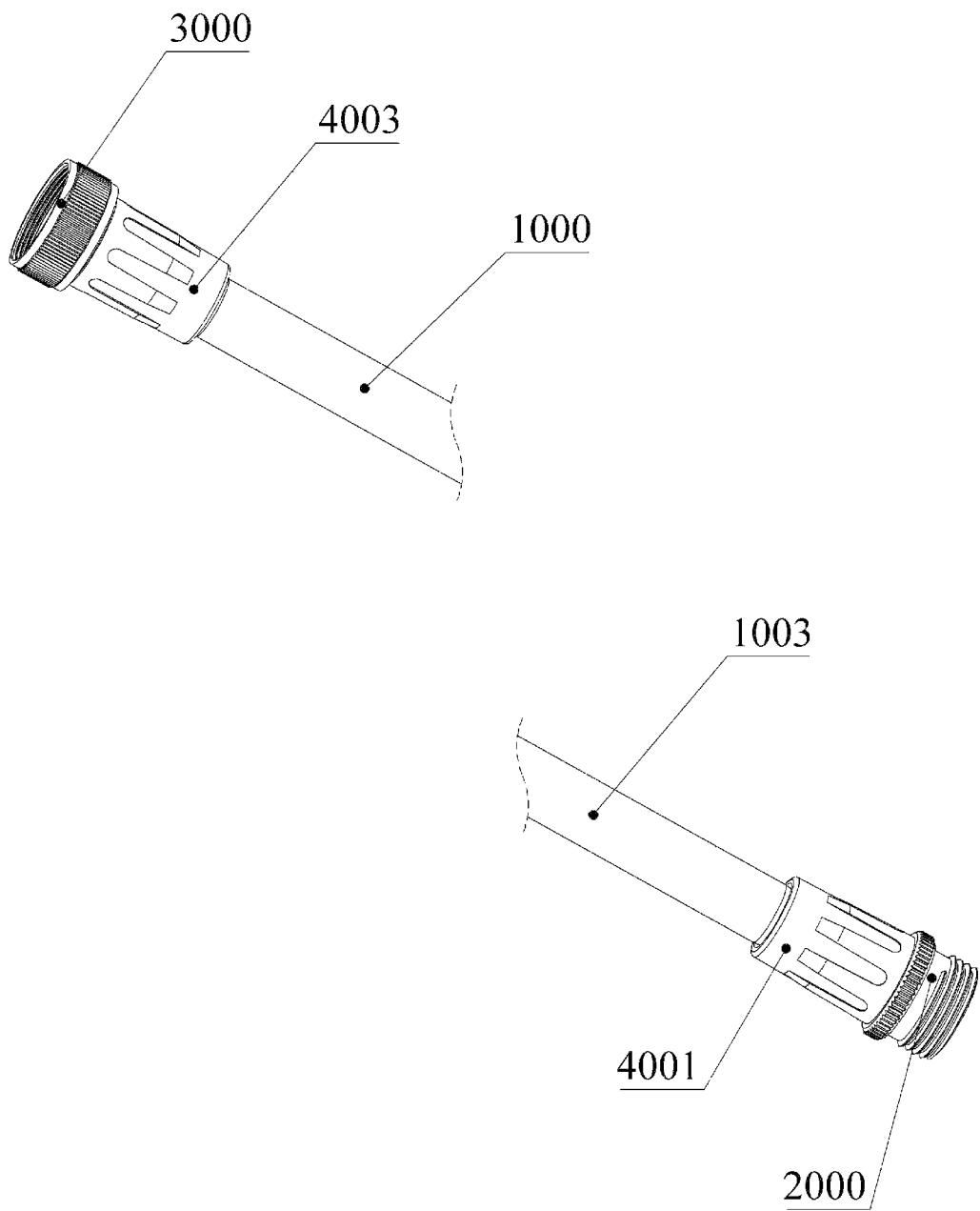
FIG. 13 is a schematic view of another embodiment of the garden hose.
Figure 14:
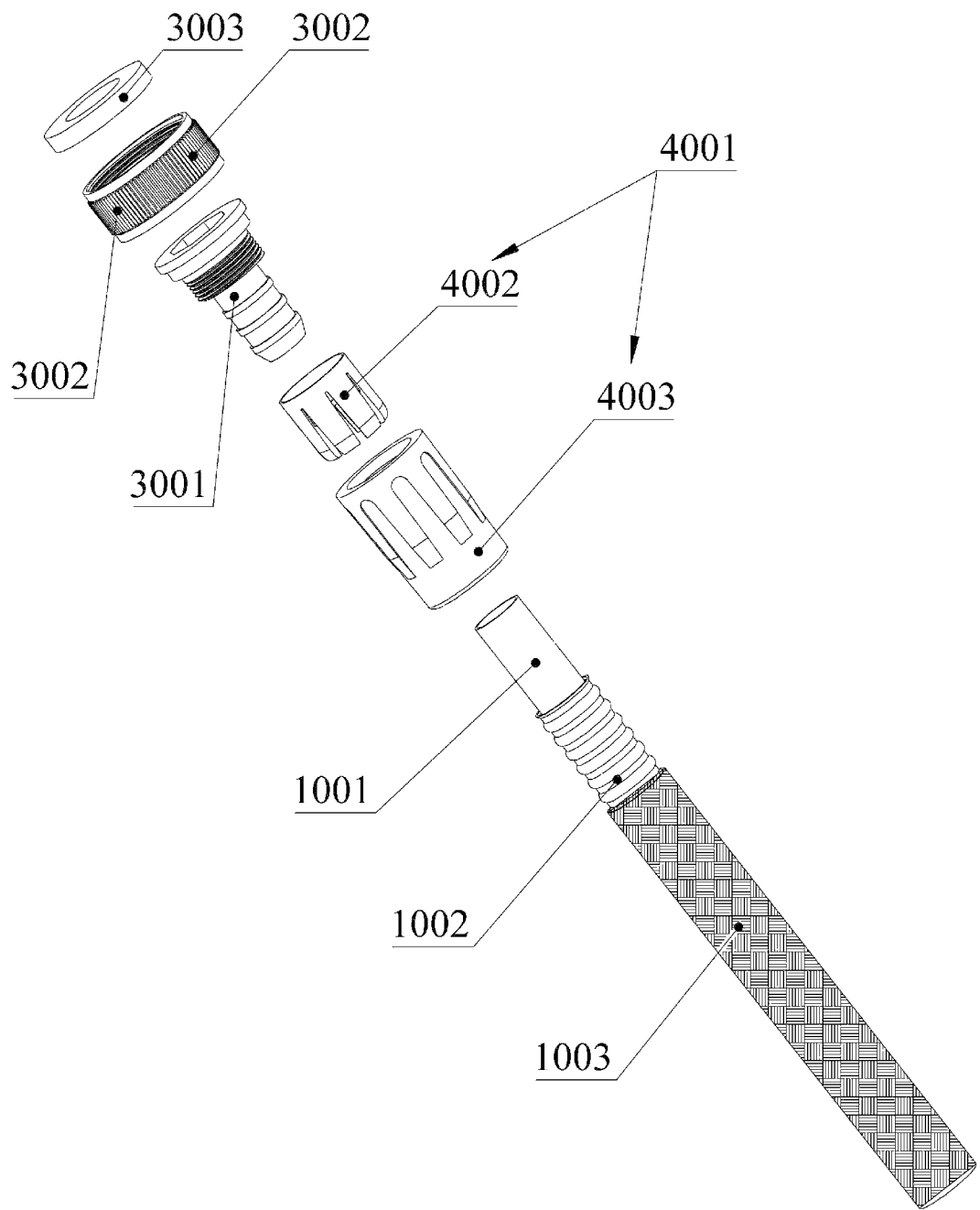
FIG. 14 is a partial exploded view of FIG. 13.

As shown in FIGS. 13 to 14, in this embodiment, the clamping component 4001 includes an inner snap ring 4002 and an outer sleeve 4003; the inner snap ring 4002 is sleeved on the third tubular part 1003, and the outer sleeve 4003 is sleeved on the inner snap ring 4002 and the third tubular part 1003, and is connected with the first connector 2000.

In this embodiment, the inner snap ring 4002 and the outer sleeve 4003 are made of metal materials. In other embodiments, the inner snap ring and the outer sleeve are not limited to being made of metal materials, but can also be made of plastic, silica gel and any desired materials.

Figure 15:
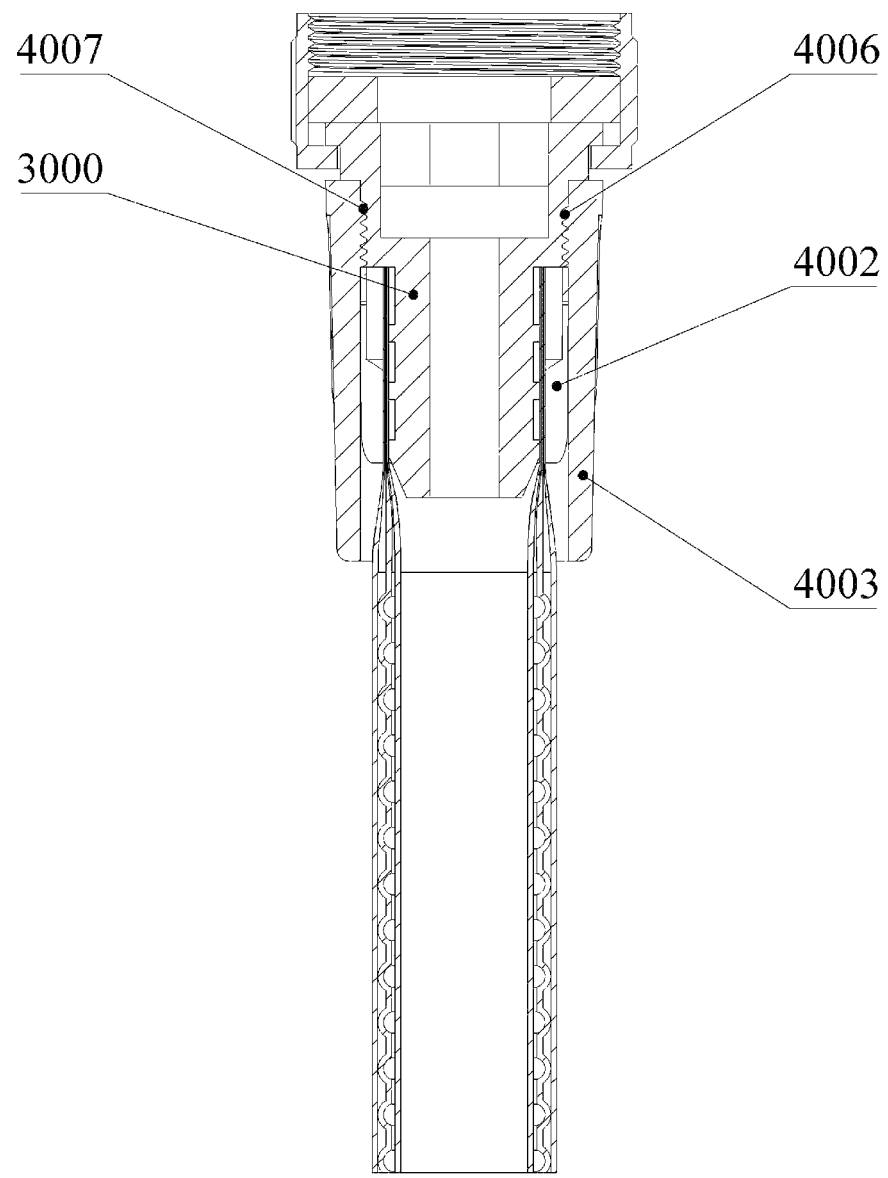
FIG. 15 is a sectional view of FIG. 13.
Figure 16:
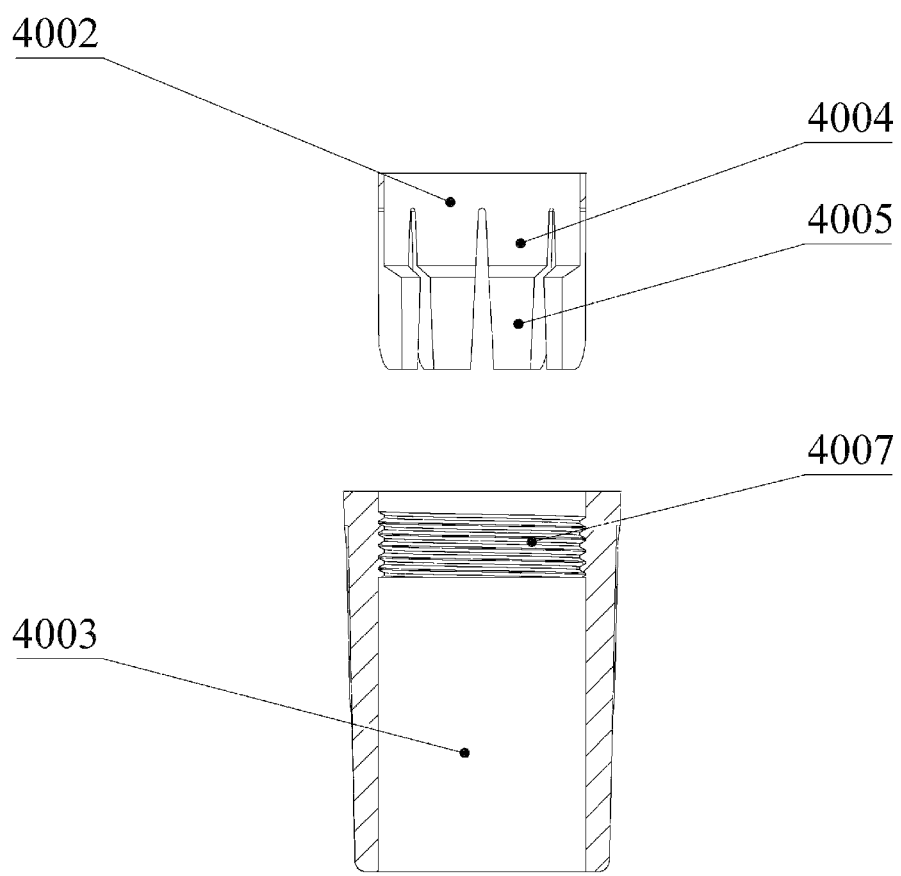
FIG. 16 is a schematic diagram of a clamping component.

As shown in FIGS. 15 to 16, in this embodiment, the minimum inner diameter of the outer sleeve 4003 is smaller than the maximum outer diameter of the inner snap ring 4002.

In this embodiment, both the first connector and the second connector 3000 are provided with a first threaded part 4006, and the outer sleeve 4003 is provided with a second threaded part 4007 corresponding to the first threaded part 4006. The inner snap ring 4002 includes a compression part 4004, which is roughly in the shape of a sheet with an arc; an array is formed on the inner snap ring 4002, and a compression block 4005 is arranged on the compression part 4004. When the outer sleeve 4003 is connected with the first connector 2000 or the second connector 3000, the outer sleeve 4003 drives the inner snap ring 4002 to compress the pipe body 1000, increasing the friction between the pipe body 1000 and the first connector or the second connector.

Figure 17:
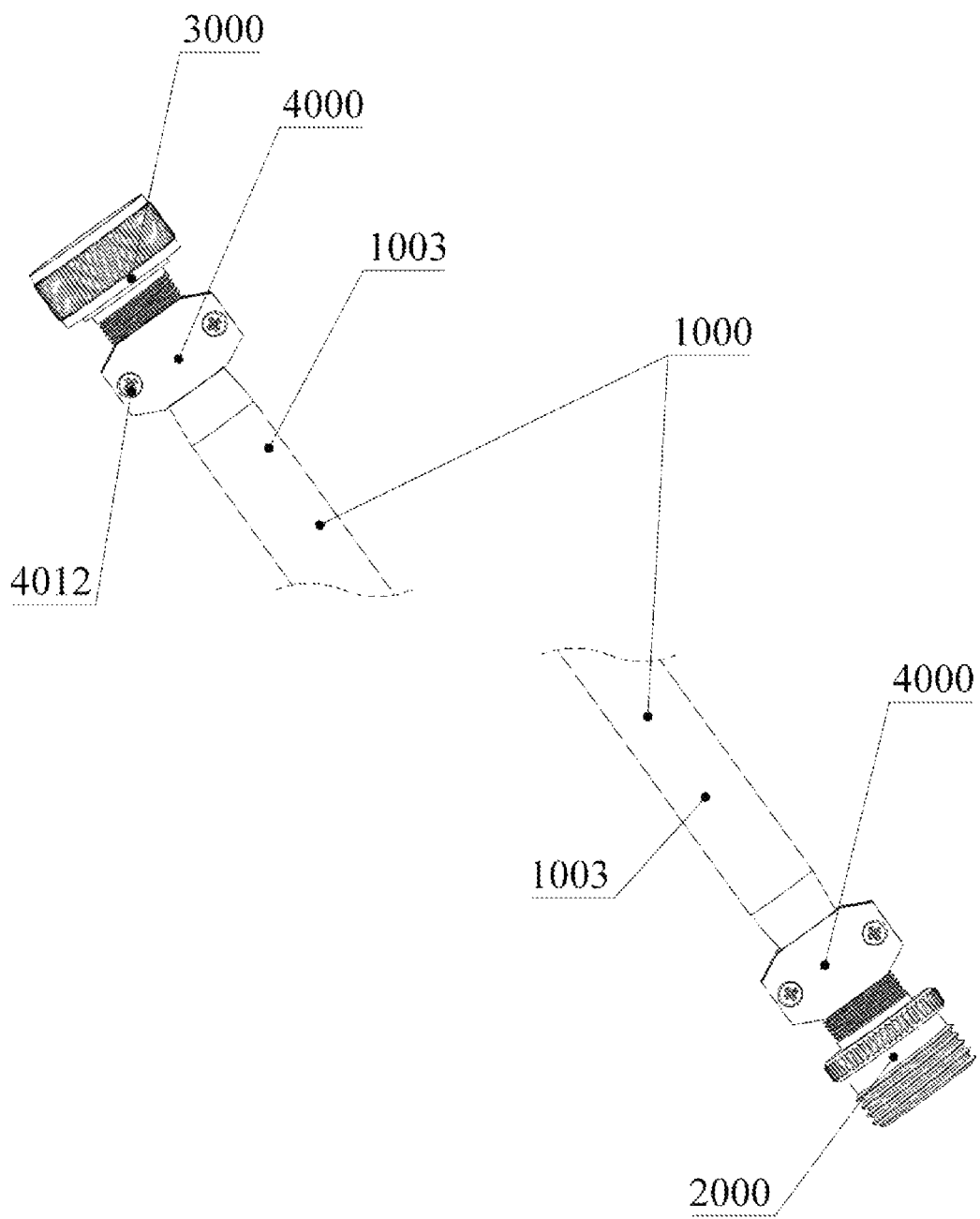
FIG. 17 is a schematic view of another embodiment of FIG. 13.
Figure 18:
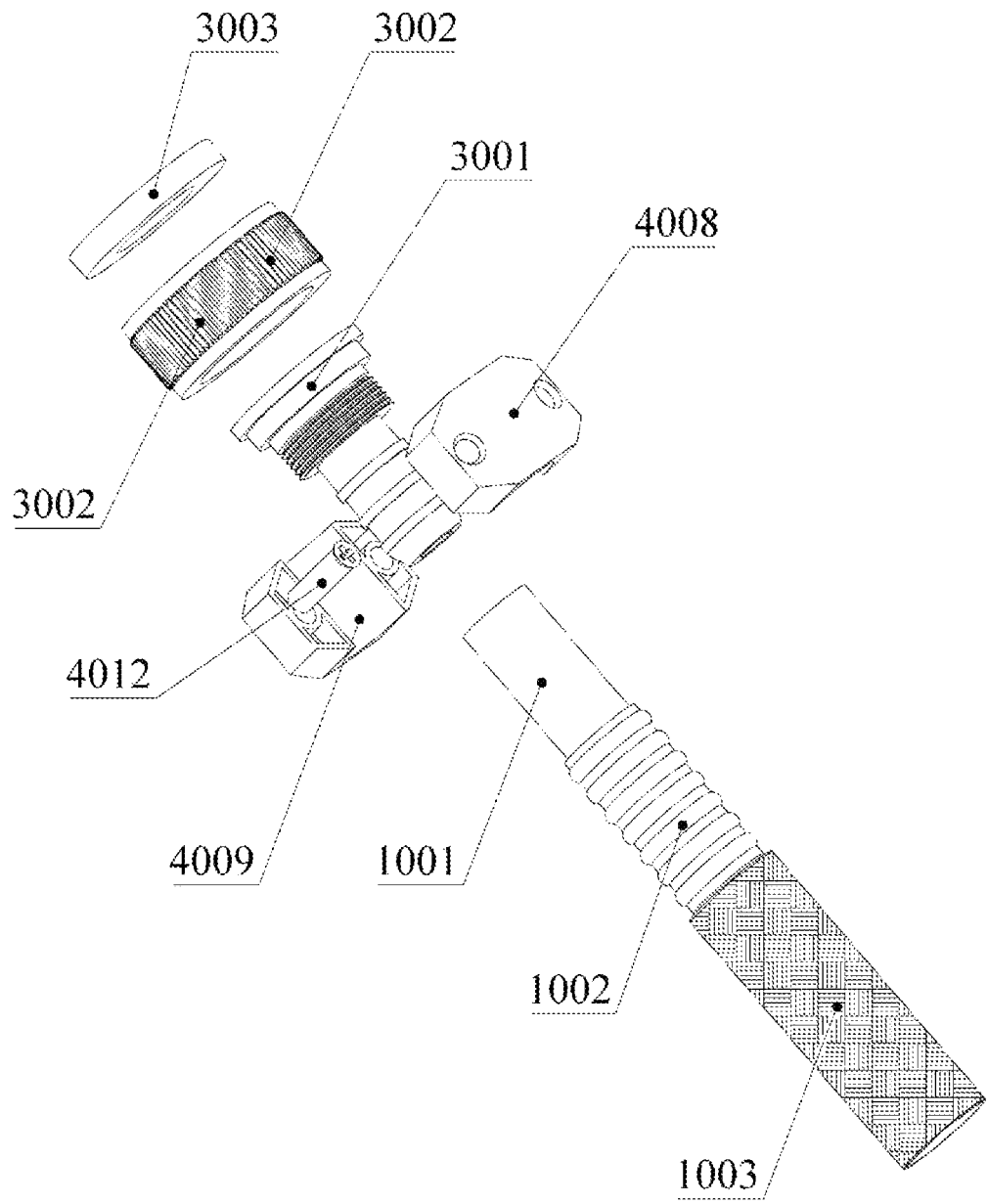
FIG. 18 is an exploded view of FIG. 17.
Figure 19:
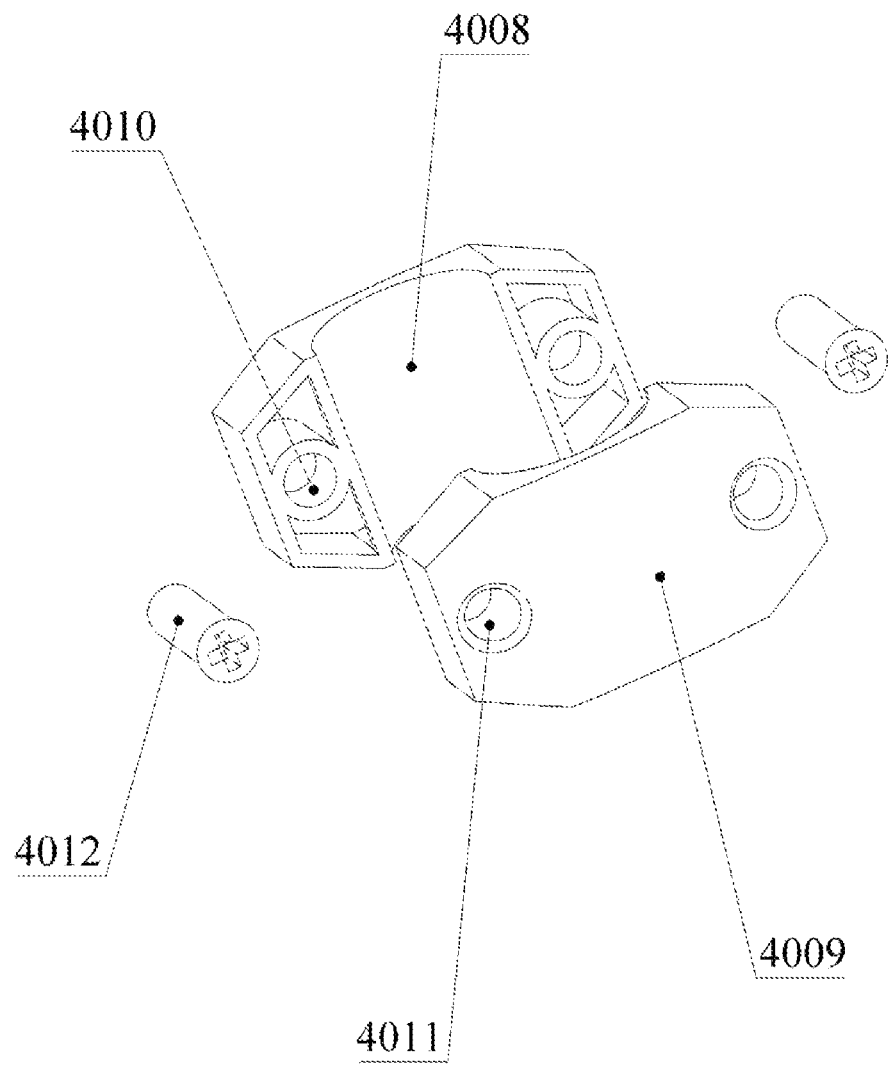
FIG. 19 is a schematic view of another embodiment of the clamping component.

As shown in FIGS. 17 to 19, in another embodiment, the clamping component includes a first fixing block, a second fixing block and a fastener, and the first fixing block 4008 and the second fixing block 4009 are sleeved on the third tubular part 1003.

The first fixing block 4008 is provided with at least one first fixing hole 4010, and the second fixing block 4009 is provided with at least one second fixing hole 4011 corresponding to the first fixing hole 4010. The first fixing block 4008 and the second fixing block 4009 are fixedly connected by fasteners 4012.

In this embodiment, the first fixing block 4008 and the second fixing block 4009 are fixedly connected by fasteners 4012. In other embodiments (not shown in the figure), the first fixing block and the second fixing block are not limited to being fixedly connected by fasteners, but can also be arranged as snap connection, welding, hook and loop connection and any desired connection mode.

The present invention further provides a process for producing a composite garden hose, which includes the following steps:

step 1, preparing an elastic material and a first extruder for manufacturing a first tubular part; preparing a material and a second extruder for manufacturing a second tubular part; preparing a fabric material and a knitting machine for manufacturing said third tubular part; preparing a die and a punching machine for stamping; wherein said first extruder, said second extruder and said knitting machine are arranged in sequence;

Step 2, preparing grips, metal fasteners, a first connector and a second connector;

Step 3, starting the machine, introducing a first tubular part extruded by said first extruder into said second extruder, and said second extruder extruding a second tubular part covering said first tubular part outside the first tubular part; introducing the first tubular part and the second tubular part into said knitting machine, and knitting a third tubular part covering said second tubular part outside said second tubular part to form a continuous pipe body;

Step 4, cutting said continuous pipe into required lengths;

Step 5, sleeving the pipe body after cutting with two grips;

Step 6, sleeving both ends of said pipe body with a metal fastener;

Step 7, respectively inserting said first connector and said second connector into both ends of said pipe body;

Step 8, punching and pressing said metal fastener by said die and said punching machine, so that one end of said metal fastener and said pipe body are closely connected with said first connector; tightly connecting said metal fastener, said other end of said pipe body and said second connector; and Step 9, connecting one of said grips with said first connector; connecting the other grip to said second connector.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A composite garden hose, comprising:
   a pipe body, a first connector and a second connector, wherein said pipe body comprises:
   a first tubular part made of an elastic material to transport liquid; and
   a second tubular part made of plastic, metal, or a rubber material, wherein said second tubular part has a corrugated structure and is continuously formed around said first tubular part to limit expansion of said first tubular part; and
   a third tubular part made of a fabric material and continuously formed around said second tubular part to protect said first tubular part and said second tubular part; and
   a hardness of said first tubular part is lower than that of said second tubular part; and
   wherein, said first connector is arranged at one end of said pipe body, and said second connector is arranged at an other end of said pipe body; and one end of the pipe body is connected with said first connector utilizing a metal fastener, and the other end of the pipe body is connected with said second connector also utilizing a metal fastener;
   wherein a grip is sleeved on said third tubular part, and said grip is detachably connected with said first connector or said second connector; and
   said grip is made of an elastic material, and one end of said grip is curled inward to form a buckle part; and a groove is formed between said first connector and said metal fastener utilized by the first connector, a groove is formed between said second connector and said metal fastener utilized by the second connector, and said buckle part is clamped into one of the grooves.

2. The composite garden hose according to claim 1, wherein said grip is made of an elastic material and said buckle part is clamped on said first connector; or said buckle part is clamped on said second connector.

3. The composite garden hose according to claim 1, wherein said grip is made of an elastic material, and one end of said grip is provided with internal threads; and said first connector and said second connector are both provided with external threads, and said external threads are for connecting said grip, and said grip is connected with said first connector or said second connector through said external threads.

4. The composite garden hose according to claim 1, wherein said first connector comprises a pipe connecting part, an anti-slip part and an external thread connecting part which are arranged in sequence; and
   said second connector comprises a connecting core, an internal thread bushing, and a sealing ring, wherein said sealing ring is elastic; and
   said connecting core is for connecting with said pipe body; and said connecting core is provided with a first flange extending outwards; and said first flange is arranged at one end of said connecting core away from said pipe body; and one end of said internal thread bushing is provided with a second flange, and said second flange extends inward; and an outer diameter of said first flange is greater than an inner diameter of said second flange.

5. The composite garden hose according to claim 4, wherein anti-slip grooves are arranged outside said internal thread bushing, and said anti-slip grooves extend in an axial direction; and said anti-slip grooves are arrayed along an outer circumference of said internal thread bushing.

6. The composite garden hose according to claim 4, wherein said sealing ring is made of rubber or silica gel, an outer diameter of said sealing ring is larger than an inner diameter of said internal thread bushing, and when said sealing ring is installed in said internal thread bushing, said sealing ring is capable of limiting said internal thread bushing.

7. The composite garden hose according to claim 4, wherein more than one first groove is formed on said pipe connecting part, and said more than one first groove is for increasing friction; and said more than one first groove surrounds said connecting part of said pipe body; and a chamfer is also arranged at said pipe connecting part, and said chamfer is arranged at one end-far away from said anti-slip part.

8. The composite garden hose according to claim 4, wherein an insertion part is arranged at said pipe connecting part, said insertion part is arranged at one end away from said anti-slip part; and an outer diameter of said insertion part is larger than that of said pipe connecting part, and a chamfer is arranged on said insertion part; and a surface of said pipe connecting part is provided with more than two second grooves along the axial direction, and said second grooves are for increasing friction; and said more than two second grooves are evenly distributed on the surface of said pipe connecting part.

9. The composite garden hose according to claim 1, wherein said first tubular part is made of rubber or plastic; and when a water pressure increases, said first tubular part will expand radially, and the radial expansion of said first tubular part will be limited by a maximum diameter of said second tubular part.

10. The composite garden hose according to claim 1, wherein said fabric material of said third tubular part is woven and cannot be radially expanded; and a thickness of said third tubular part is 0.3 mm to 0.8 mm.

11. The composite garden hose according to claim 1, wherein said grip is made of plastic, and said grip has a thickness of 1 mm to 10 mm and a length of 20 mm to 200 mm.

12. The composite garden hose according to claim 1, wherein said second tubular part is a spiral pipe made of metal.

13. The composite garden hose according to claim 1, wherein each of said metal fasteners is provided with a shape having an increased diameter section or a cylindrical shape.

14. The composite garden hose according to claim 1, wherein said third tubular part is made of plastic or a metal material.

* * * * *